United States Patent
Martin et al.

(10) Patent No.: US 7,795,346 B2
(45) Date of Patent: Sep. 14, 2010

(54) SINTERED POROUS HIGH MELT-FLOW INDEX MATERIALS AND METHODS OF MAKING SAME

(75) Inventors: Timothy A. Martin, Newman, GA (US); Guoqiang Mao, Smyrna, GA (US)

(73) Assignee: Porex Corporation, Fairburn, GA (US)

( * ) Notice: Subject to any disclaimer, the term of this patent is extended or adjusted under 35 U.S.C. 154(b) by 0 days.

(21) Appl. No.: 10/978,449

(22) Filed: Nov. 2, 2004

(65) Prior Publication Data

US 2005/0124710 A1 Jun. 9, 2005

Related U.S. Application Data

(60) Provisional application No. 60/516,319, filed on Nov. 3, 2003.

(51) Int. Cl.
 *C08G 73/10* (2006.01)
 *C08F 14/14* (2006.01)
 *C08F 110/06* (2006.01)
 *C08F 110/02* (2006.01)

(52) U.S. Cl. .................. 524/847; 526/291; 526/351; 526/352

(58) Field of Classification Search ................. 526/352, 526/351, 291; 524/847
See application file for complete search history.

(56) References Cited

U.S. PATENT DOCUMENTS

| | | | |
|---|---|---|---|
| 3,238,148 A * | 3/1966 | Osborne ..................... 252/478 |
| 3,297,805 A | 1/1967 | Rottig et al. |
| 5,512,342 A * | 4/1996 | Rober et al. ............. 428/36.91 |
| 5,514,231 A | 5/1996 | Thomas |
| 5,527,569 A | 6/1996 | Hobson et al. |
| 5,677,047 A | 10/1997 | Thomas |
| 6,218,000 B1 | 4/2001 | Rudolf et al. |
| 6,223,933 B1 * | 5/2001 | Hochrainer et al. ......... 220/723 |
| 6,551,608 B2 * | 4/2003 | Yao ............................ 424/409 |
| 2003/0029789 A1 | 2/2003 | Patil |
| 2008/0149571 A1 | 6/2008 | Zeller et al. |
| 2008/0220271 A1* | 9/2008 | Baumert et al. .......... 428/474.4 |
| 2008/0227880 A1 | 9/2008 | Yoshimoto et al. |

FOREIGN PATENT DOCUMENTS

| | | |
|---|---|---|
| EP | 0736266 | 10/1996 |
| EP | 1464381 | 10/2004 |
| GB | 1 209 530 A | 10/1970 |
| GB | 1 435 067 A | 5/1979 |
| GB | 1 549 949 A | 8/1979 |
| GB | 2337991 | 12/1999 |
| JP | 63 308158 | 12/1988 |
| JP | 09 165301 | 6/1997 |
| JP | 2000273675 | 10/2000 |
| JP | 2001 354797 | 12/2001 |
| JP | 2002 336619 | 11/2002 |
| WO | WO 01/37995 A | 5/2001 |
| WO | WO-0165937 | 9/2001 |
| WO | WO-2006127946 | 11/2006 |
| WO | WO-2007133609 | 11/2007 |

OTHER PUBLICATIONS

PCT/US2004/036447 International Search Report dated Feb. 24, 2005.
PCT/US2004/036447 International Preliminary Examination Report dated Sep. 21, 2005.
EP04800587.0 First Office Action dated Jan. 25, 2007.
EP04800587.0 Second Office Action dated Aug. 2, 2007.
EP04800587.0 Third Office Action dated Mar. 13, 2008.
EP04800587.0 Fourth Office Action dated Dec. 10, 2008.
EP04800587.0 Fifth Office Action dated Oct. 21, 2009.
PCT/US2009/061825 International Search Report and Written Opinion dated Jan. 21, 2010.
International Search Report, Feb. 24, 2005.

* cited by examiner

*Primary Examiner*—William K Cheung
(74) *Attorney, Agent, or Firm*—Kilpatrick Stockton LLP

(57) ABSTRACT

Sintered porous materials comprising high melt-flow rate polymers are described, as are methods of making and using the same. Specific materials comprise a high melt-flow rate polymer and a thermally conductive material.

9 Claims, No Drawings

SINTERED POROUS HIGH MELT-FLOW INDEX MATERIALS AND METHODS OF MAKING SAME

CROSS REFERENCE TO RELATED APPLICATIONS

This application claims the benefit of U.S. Provisional Application Ser. No. 60/516,319, filed Nov. 3, 2003, the disclosure of which is incorporated herein by reference in its entirety.

1. FIELD OF THE INVENTION

This invention relates, in part, to sintered porous materials comprising high melt-flow index polymers and methods of making and using the same.

2. BACKGROUND OF THE INVENTION

Sintering, which is a common method of manufacturing porous plastic materials, is a process wherein plastic particles or pellets are fused together by heat. It has been reported that the sinterability of a material (i.e., how well it sinters) is a function of its melt-flow index (MFI). See, e.g., U.S. Pat. No. 3,954,927 to Duling et al.

The MFI of a material reflects the degree to which it flows when subjected to a given weight at a given temperature. For example, ultra-high molecular weight polyethylene has no measurable melt-flow rate at 190° C. under a 21,600 gram load. See ASTM D1238-65T. In general, polyethylene particles that have a melt-flow index of 0 to 6 grams per 10 minutes at 190° C. under a 21,600 gram load sinter evenly to provide a final product with desirable mechanical properties and porosity. By contrast, it has been observed that polyethylene particles with high MFIs (i.e., greater than about 6 grams per 10 minutes under these conditions) simply melt during the heating and cooling cycle and form solid non-porous product, or only partially sintered and form weak or deformed product. This results in sintered porous products that are inconsistent in terms of their shape, mechanical properties, porosities and average pores sizes.

Sintered porous plastic materials with high MFI materials would provide advantages over conventional low MFI polymers. High MFI materials are easy to be compounded and many additives can be added to high MFI polymer materials without significant difficulty. However, low MFI materials are difficult to compound because of their poor flow properties in the extruder. The sintered porous plastics from high MFI materials will have new properties bring in by the additives. Compared with low MFI materials, high MFI materials generally are less expensive and will have cost advantage over low MFI polymer materials.

A process that allows the sintering of high MFI materials would provide a variety of advantages. Such advantages could include, for example, the ability to use relatively inexpensive raw materials, instead of the typically more expensive low MFI materials. Such a process could also reduce the cycle times necessary for the production of thick products. Until now, however, it has not been thought possible to sinter high MFI materials.

3. SUMMARY OF THE INVENTION

This invention is directed, in part, to sintered materials comprised of a high MFI polymer and a thermally conductive material, and to methods of making and using the same.

The invention also encompasses particles and pellets comprised of a high MFI polymer and (e.g., compounded with) a thermally conductive material.

Also encompassed by the invention is a method of increasing the sinterability of particles or pellets of a high MFI material, which comprises contacting the particles or pellets with a thermally conductive material.

4. DETAILED DESCRIPTION OF THE INVENTION

Contrary to previous thinking, it has been discovered that high MFI materials can actually be sintered under certain conditions to provide porous materials with highly desirable properties (e.g., pore size, porosity, strength and durability). In particular, it has been found that materials with high MFIs can be sintered when they are combined with one or more thermally conductive materials. Thus, it is been discovered that the sinterability of a material is not only a function of its MFI, but also is a function of its thermal conductivity, as well. Without being limited by the theory, it is believed that a higher thermal conductivity can significantly improve the sinterability of a material by reducing its tendency to fully melt during the sintering process and/or improving the heat transfer from particle to particle or from pellet to pellet.

A first embodiment of the invention encompasses sintered porous materials comprised of a high MFI polymer. In one embodiment, the material further comprises a thermally conductive material.

As used herein to describe polymeric materials in general, the terms "high melt-flow rate," "high melt-flow index" and "MFI" refer to materials that, when sintered under conventional sintering conditions without the use of thermally conductive materials as described herein, simply melt, only partially sinter, deform, and/or result in products that are inconsistent in terms of their shape, mechanical properties, porosities and average pores sizes.

As used herein to describe a polyethylene material, the terms "high melt-flow rate," "high melt-flow index" and "MFI" refer to a material that has a melt-flow rate of greater than about 6, 7, 8, 9, 10, 12, 15, 16, or 17 grams per 10 minutes at 190° C. under a 21,600 gram load. The MFI of a polyethylene material is the number of grams per 10 minutes at 190° C. under a 21,600 gram load. As those skilled in the art are well aware, this number can be calculated using data obtained under different conditions (e.g., different loads, such as 2,160 and 216 grams).

As used herein to describe a polypropylene material, the terms "high melt-flow rate," "high melt-flow index" and "MFI" refer to a material that has a melt-flow rate of greater than about 2, 3, 4, 5, 6, 10, grams per 10 minutes at 230° C. under a 2,160 gram load. The MFI of a polypropylene material is the number of grams per 10 minutes at 230° C. under a 2,160 gram load.

As used herein to describe a poly(vinylidene fluoride) (PVDF) material, the terms "high melt-flow rate," "high melt-flow index" and "MFI" refer to a material that has a melt-flow rate of greater than about 2, 3, 4, 5, 6, 10, grams per 10 minutes at 232° C. under a 12,500 gram load. The MFI of a PVDF material is the number of grams per 10 minutes at 232° C. under a 12,500 gram load As used herein to describe a material, the terms "thermally conductive" and "thermo-conductive" refer to a material that conducts heat. The thermal conductivity (lambda) of a material determines the amount of heat (e.g., in Watts (W)) that will flow through a unit area (e.g., $m^2$) and unit thickness (e.g., 1 m) of the material, when a temperature difference (e.g., of 1 K) is established between its surfaces. This property can be determined by methods known in the art (e.g., ASTM C 177).

By way of example, the thermal conductivity of typical plastics is about 0.0004 cal·cm/° C.·cm$^2$·sec, whereas the thermal conductivity of copper is 0.95 cal·cm/° C.·cm$^2$·sec and the thermal conductivity of iron is 0.12 cal·cm/° C.·cm$^2$·sec. Specific thermally conductive materials of this invention have a thermal conductivity of greater than about 0.34, 0.5, 0.75, 1, 1.5, 2, or 5 Watts per meter per degrees Kelvin at 50° C. (as those skilled in the art are aware, 1 cal·cm/° C.·cm$^2$·sec=418.7 watts/m·K).

Another embodiment of the invention encompasses particles (and pellets) comprised of a high MFI polymer and a thermally conductive material. Specific particles are substantially spherical. Specific particles comprise a core of high MFI polymer coated with a thermally conductive coating.

Another embodiment of the invention encompasses a method of making a sintered material, which comprises sintering particles comprised of a high MFI polymer and (e.g., compounded with) a thermally conductive material. Specific particles comprise a high MFI polymer coated with a thermally conductive coating.

Another embodiment of the invention encompasses a method of making a sintered material, which comprises contacting particles of a high MFI polymer with particles of a thermally conductive material to provide a blend, and sintering the blend. In a particular method, the polymer particles and thermally conductive particles are blended to provide a uniform mixture.

Another embodiment of the invention encompasses a method of increasing the sinterability of particles of a high MFI material which comprises contacting the particles with particles of a thermally conductive material.

4.1. High Melt-Flow Index Polymers

Typical polyethylene high MFI materials that can be used in materials and methods of the invention have a MFI of greater than about 6 grams per 10 minutes at 190° C. under a 21,600 gram load. Typical polypropylene high MFI materials that can be used in materials and methods of the invention have a MFI of greater than about 2 grams per 10 minutes at 230° C. under a 2,160 gram load. Typical PVDF high MFI materials that can be used in materials and methods of the invention have a MFI of greater than about 2 grams per 10 minutes at 232° C. under a 12,500 gram load. The MFI of a material can readily be determined using techniques known in the art, such as with the use of extrusion plastometers. See, e.g., ASTM D1238-65T. The temperature at which certain materials sinter can also be readily determined by routine methods such as, but not limited to, DSC, thermal mechanical analysis and dynamic mechanical thermal analysis.

Examples of high MFI polymers include, but are not limited to, those made of polyethylene (e.g., high density polyethylene), polypropylene, PVDF, PTFE, PMMA, polystyrene, nylon, polyurethane, and derivatives and blends thereof.

4.2. Thermally Conductive Materials

A variety of thermally conductive materials can be incorporated into the particles and sintered materials of the invention. Preferred thermally conductive materials are materials that improve the sinterability of high MFI materials.

Thermally conductive materials can be organic, inorganic (e.g., metallic), or organometallic. Examples of thermally conductive materials include, but are not limited to, carbon (e.g., graphite), carbon fiber, carbon black, ceramics, metals (e.g., aluminum, nickel, iron, copper, chromium, titanium, gold and silver) and alloys (e.g., brass and steel) and oxides (e.g., tin oxide) thereof, and thermo-conductive polymers (e.g., polyanilines, polypyrrols and polythiophenes). Typically, thermally conductive materials used in the materials and methods of the invention are in powder, or particulate, form. In some embodiments, the thermally conductive materials are in fibrous form or liquid form Most thermally conductive materials are electrically conductive, as electrical conductivity can be directly related to thermo-conductivity. Thermally conductive materials have a surface resistivity of greater than about $10^6$, $10^4$, $10^2$, or $10^{-1}$ ohms/sq. Particular materials have a surface resistivity of from about $10^5$ to about $10^{-4}$, from about $10^4$ to about $10^{-3}$, or from about $10^3$ to about $10^{-1}$ ohms/sq. Surface resistivity can be measured using methods known in the art (e.g., ASTM D257).

The high melt flow material of a preferred embodiment of the present invention has a surface resistivity of greater than about $10^2$ ohms/sq. In another embodiment, the high melt flow material has a surface resistivity of greater than about $10^4$ ohms/sq. In still another embodiment, the high melt flow material has a surface resistivity of greater than about $10^6$ ohms/sq.

4.3. Pellet and Particle Formation

As discussed herein, materials of the invention are preferably made by sintering particles or pellets comprised of a high MFI material. Certain particles or pellets further comprise a thermally conductive material. The high MFI polymer used to produce the particles or pellets may either already comprise a thermally conductive material prior to sintering (e.g., the high MFI polymer is purchased already containing the thermally conductive material) or the thermally conductive material may be added to the high MFI material by contacting particles of the high MFI polymer with particles of a thermally conductive material to provide a blend, and the resulting blend is sintered. In either case, the particles can be produced using methods known in the art.

One method of compounding one or more high MFI polymer(s) and one or more thermally conductive material(s) uses screw extrusion and pelletizing (e.g., underwater pelletizing). The compounded material can also be ambiently or cryogenically ground to a given particle size.

Typical screw extruders, which can be used to prepare materials of the invention, consist of a long auger screw that fills the opening of a steel tube. Plastic and additives that are placed at one end of the screw are mixed and melted when the screw turns. The screw extruder functions in the same way as a friction pump. A plastic extruder compounder works on the same principle.

Typical extruders are enclosed in a steel tube with two small openings at both ends. One opening on top allows plastics and additives (e.g., thermally conductive material) to enter. The second opening at the opposite end shapes the melted and mixed plastic into rods. Plastic in the form of pellets, powder, or granules enter through the small hole in the top of one end of an enclosed steel tube. The steel tube, called a barrel, is wrapped with heating elements to maintain the barrel at the melt temperature of the plastic. A steel auger screw, with an expanding root diameter, fills the center of the tube. The plastic is pumped from one end of the screw to the other by rotating the screw. The rate at which the plastic moves from one end of the extruder to the other is controlled by the speed of the screw.

Typical screws are divided into three section, which can be identified by changes in the root diameter of the screw. These sections are referred to as the mixing, compression, and metering sections. In the mixing section, the root diameter remains constant and the materials are mixed. The materials then pass to the compression section, wherein the root diameter expands to compress the mixture, which is subsequently passed to the metering section.

The rotation of the screw, the friction at the barrel wall, and the forward movement of the screw produce a three-way internal mixing of pellets and additives. The mixing process takes place as the friction between the hot wall of the barrel and the plastic melts the outside of the plastic pellets. The screw rotation rolls and tumbles the mixture back into the center of the space between the screw flights. The leading edges of the screw flight scrapes the melted plastic off the wall of the barrel and collects it into an expanding pool. Mixing occurs in all three sections of the screw: dry mixing in the first section, compression and melting in the second section, and complete homogenization in the metering section.

In the mixing section, the root diameter of the screw remains constant. The root of a screw is the center rod to which the screw flights are attached. The root diameter increases in size from the mixing section to the metering section. In the mixing section, the root diameter accounts for approximately one third of the space between the barrel wall. As the screw rotates, plastic and additives are softened and mixed. The small constant root diameter in the mixing section mixes the plastic with additives without compressing them. This allows the irregular shaped pellets and additives to soften and settle into open spaces, becoming more compact, and mixing uniformly.

As the mixing ends, the compression section begins when the screw's root diameter gradually increases. The gradual increase in the screw's root diameter plus the rotating screw pushes the plastic pellets and additives against the wall of the barrel and screw flights. This compression intensifies the shearing and mixing action of the screw and completes the melting of the plastic. The compression section account for one third of the center of the screw. The length of the compression section can be shortened to increase the shear and mixing of the material or it may be lengthened to decrease these forces.

In the final, metering, section, the root diameter is at its largest and remains constant from here on. The metering section intensifies the mixing action and provides for homogenization of the plastic melt with its additives. When the plastic leaves the extruder, it emerges with physical and thermal homogeneity, ready to be shaped by, for example, a strand die and/or cut into pellets.

Particles and pellets can also be produced using underwater pelletizing, or rapid water-quench pelletizing. See, e.g., U.S. Pat. No. 6,030,558 to Smith et al., the entirety of which is incorporated herein by reference.

The formation of particles comprised of a high MFI thermoplastic using underwater pelletizing typically requires an extruder or melt pump, an underwater pelletizer, and a drier. The thermoplastic resin and optional other materials (e.g., graphite or aluminum powder) are fed into an extruder or a melt pump and heated until semi-molten, or, alternatively, the thermoplastic is heated until semi-molten, after which the optional other materials are added. The semi-molten material is then forced through a die. As the material emerges from the die, at least one rotating blade cuts it into pieces herein referred to as "pre-particles." The rate of extrusion and the speed of the rotating blade(s) determine the shape of the particles formed from the pre-particles, while the diameter of the die holes determine their average size. Water, or some other liquid or gas capable of increasing the rate at which the pre-particles cool, flows over the cutting blade(s) and through the cutting chamber. This coagulates the cut material (i.e., the pre-particles) into particles, which are then separated from the coolant (e.g., water), dried, and expelled into a holding container.

The average size of particles produced by underwater pelletizing can be accurately controlled and can range from about 0.010" (254 µm) to about 0.125" (3.18 mm) or from about 0.010" (254 µm) to about 0.25" (6.36 mm) in diameter, depending upon the thermoplastic. Average particle size can be adjusted simply by changing dies, with larger pore dies yielding proportionally larger particles. The average shape of the particles can be optimized by manipulating the extrusion rate and the temperature of the water used in the process. Specific particles of the invention comprise a high MFI polymer and a thermally conductive material in a weight ratio from about 1 to about 80 percent thermal conductor and about 99 to about 20 polymer.

While the characteristics of a sintered porous material can depend on the average size and size distribution of the particles used to make it, they can also depend on the particles' average shape. Particles and pellets used in the invention can be of any size or shape. However, in one embodiment of the invention, the particles are substantially spherical. This shape provides specific benefits. First, it facilitates the efficient packing of the particles within a mold. Second, substantially spherical particles, and in particular those with smooth edges, tend to sinter evenly over a well defined temperature range to provide a final product with desirable mechanical properties and porosity.

Particles and pellets used in the invention can have sharp edges. However, in a specific embodiment of the invention, the thermoplastic particles are substantially spherical and free of rough edges. Consequently, if the particles used in this method are commercially available, they are thermal fined to ensure smooth edges and screened to ensure a proper average size and size distribution. Thermal fining, which is well known to those skilled in the art, is a process wherein particles are rapidly mixed and optionally heated such that their rough edges become smooth. Mixers suitable for thermal fining include the W series high-intensity mixers available from Littleford Day, Inc., Florence, Ky.

Particles made using cryogenic grinding are likewise preferably thermal fined to ensure smooth edges and screened to ensure a proper average size and size distribution. Advantageously, particles made using underwater pelletizing are often substantially spherical in shape and of a narrow size distribution, so that subsequent thermal fining and screening need not be performed.

4.4. Methods of Manufacture

Before sintering, the particles used to make the resulting material are typically blended to provide a uniform mixture. Depending on the desired size and shape of the final product (e.g., a block, tube, cone, cylinder, sheet, or membrane), this can be accomplished using a mold, a belt line such as that disclosed by U.S. Pat. No. 3,405,206, which is incorporated herein by reference, or other techniques known to those skilled in the art. In certain cases, the mixture is sintered in a mold. Suitable molds are commercially available and are well known to those skilled in the art. Specific examples of molds include, but are not limited to, flat sheets with thickness ranging from about 1/8 inch to about 1 inch and round cylinders of varying heights and diameters. Suitable mold materials include, but are not limited to, metals and alloys such as aluminum and stainless steel, high temperature thermoplastics, and other materials both known in the art and disclosed herein.

In some cases, a compression mold is used to provide the sintered material. The mold is heated to the sintering temperature of the particles, allowed to equilibrate, and then subjected to pressure. This pressure typically ranges from about 1 psi to about 10 psi, depending on the composition of the mixture being sintered and the desired porosity of the final product. In general, the greater the pressure applied to the mold, the smaller the average pore diameter and the greater the mechanical strength of the final product. The duration of time during which the pressure is applied also varies depending on the desired porosity and dimension of the final product, and is from about 2 to about 60 minutes, or from about 2 to about 20 minutes, or from about 2 to about 10 minutes, or from about 4 to about 6 minutes. The skilled artisan, however, would be able to determine the duration of time necessary over which the pressure must be applied to obtain the desired porosity and dimension of the final product. In other cases, the mixture is sintered in a mold without the application of pressure.

Once the sintered material has been formed, the mold is allowed to cool. If pressure has been applied to the mold, the cooling can occur while it is still being applied or after it has been removed. The material is then removed from the mold and optionally processed. Examples of optional processing include, but are not limited to, sterilizing, cutting, milling, polishing, encapsulating, and coating.

In one embodiment of this invention, particles of one or more high MFI polymers and particles of one or more thermally conductive materials are blended prior to the sintering. In another embodiment, the particles to be sintered are each comprised of a high MFI polymer compounded with a thermally conductive material. In another embodiment, particles of a high MFI polymer are sintered with particles comprised of a high MFI polymer compounded with a thermally conductive material. In another embodiment, the particles to be sintered are each comprised of a high MFI polymer coated with a thermally conductive material. In another embodiment, particles of a high MFI polymer are sintered with particles comprised of a high MFI polymer coated with a thermally conductive material.

Depending on how it is made, the final porous material may either have a uniform porosity and average pore size, or it may have regions of different porosities and average pore sizes. Different porosities and pore sizes can be obtained in certain areas of a porous material by applying particles with different shapes and sizes to different areas. Different porosities and pore sizes can also be achieved by using the same particles but applying different pressures on different regions of the materials during or after the sintering process, or by adjusting the sintering time.

Those skilled in the art will recognize that the average pore size of the porous polymeric material will depend, at least in part, on the average particle size of the polymeric material, the sintering temperature, and the pressure, if any, applied to the mixture during sintering. Sintering can occur on a solid support or within a mold to yield a final product that can be cut into pieces of desired shape.

4.5. Properties and Applications

Sintered materials of the invention are porous. For the purpose of this invention, average pore size and pore density can be determined using, for example, a mercury porisometer and scanning electron microscopy. Specific porous materials of this invention have an average pore size of from about 0.001 µm to about 1000 µm, from about 0.01 µm to about 500 µm, from about 0.1 µm to about 200 µm, from about 1 µm to about 100 µm, from about 1 µm to about 50 µm, from about 1 µm to about 20 µm, or from about 1 µm to about 10 µm.

While certain porous materials of the invention are electrical insulators, some are not. Specific materials have a surface resistivity of greater than about $10^{13}$, $10^{11}$, $10^8$ or $10^5$ ohms/sq. Other materials have a surface resistivity of from about $10^{13}$ to about $10^{-1}$, from about $10^{11}$ to about 10, from about $10^9$ to about $10^2$, from about $10^8$ to about $10^2$, or from about $10^6$ to about $10^2$ ohms/sq. Surface resistivity can be measured using methods known in the art (e.g., ASTM D257).

Materials of the invention have a wide range of physical and chemical properties, which can vary depending on the materials from which they are made and the process by which they are made. For example, the invention encompasses electrically conductive porous plastic tubes as well as thick-section porous sheets. Consequently, the materials can be used in a wide range of applications, such as, but not limited to: under-drain plates for wastewater treatment; dark-colored low capillary head height porous plastic structures (e.g., for use in ink overspray absorption in color photo printers); automotive instrument bezels, electronic housings, fuel filters, fuel line connectors, fuel reservoirs; printed circuit board cassettes; grounding brushings; paper tractors; font cartridges; plotter platens; ink ribbon canisters; mailing machine feed decks; IC chip trays and carriers; IC shipping tubes; wafer boats; tape and reel packaging; and tote bins used to store articles sensitive to static electricity.

5. EXAMPLES

Specific embodiments of the invention can be understood by reference to the following non-limiting examples.

5.1. Melt-Flow Index of STAT-KON F®

STAT-KON F®, a carbon compounded high density polyethylene, was obtained in pellet form from LNP Engineering, Thorndale, Pa. The pellets were ground into particles smaller than 350 microns in diameter. The MFI of the ground material was tested on an extrusion plastometer manufactured by Tinius Olsen Machine Company, Willow Grove, Pa. The material was tested at 190° C. under a weight of 2,160 grams. The MFI of the ground material was 1.2 grams per 10 minutes. When tested under 21,600 grams load at 190° C., the MFI was too high to be properly measured. This result shows that the MFI of STAT-KON F® is not within the range that, until now, was considered to be necessary for desirable sinterability.

5.2 Sintering of STAT-KON F®

Ground STAT-KON F® was sintered in tube-shaped molds. The tube molds were filled with the ground material and sintered in a 300° F. oven for 30 minutes. The resulting tubes were porous, strong and well sintered.

One of the tubes was cut into 6 inch long sections and each section was tested for back pressure. The average back pressure of ten samples was 0.25 inches of water at 240 standard cubic feet per hour of air flow. The measured back pressure was comparable to the back pressure measured on a tube made from BASF 5216Z HDPE ground smaller than 350 microns in diameter.

While the invention has been described with respect to particular embodiments, it will be apparent to those skilled in the art that various changes and modifications can be made without departing from the spirit and scope of the invention as defined in the claims. Such modifications are also intended to fall within the scope of the appended claims.

What is claimed is:

1. A porous sintered polyethylene-containing material comprising:

sintered particles of polyethylene compounded with a thermally conductive material wherein the thermally conductive material is incorporated into particles of polyethylene prior to sintering the particles of polyethylene compounded with the thermally conductive material, wherein the thermally conductive material is carbon, carbon black, carbon fiber, aluminum, copper, iron, steel or titanium and the thermally conductive material has a thermal conductivity of greater than 0.34 W/m·K, the polyethylene having a melt-flow index of greater than 16 grams per 10 minutes at 190° C. under a 21,600 gram load, wherein the porous sintered polyethylene-containing material has an average pore size ranging from about 1 nm to about 1 mm.

2. The porous sintered polyethylene-containing material of claim 1, wherein the porous sintered polyethylene-containing material has a surface resistivity of greater than $10^2$ ohms/sq.

3. The porous sintered polyethylene-containing material of claim 1, wherein the porous sintered polyethylene-containing material has an average pore size ranging from about 0.01 μm to about 500 μm.

4. The porous sintered polyethylene-containing material of claim 1, wherein the porous sintered polyethylene-containing material has an average pore size ranging from about 0.1 μm to about 200 μm.

5. The porous sintered polyethylene-containing material of claim 1, wherein the thermally conductive material incorporated into the particles of polyethylene is present in individual particles in an amount ranging from about 1 weight percent to about 80 weight percent of the particle.

6. A porous sintered polypropylene-containing material comprising:

sintered particles of polypropylene compounded with a thermally conductive material wherein the thermally conductive material is incorporated into particles of polypropylene prior to sintering the particles of polypropylene compounded with the thermally conductive material, wherein the thermally conductive material is carbon, carbon black, carbon fiber, aluminum, copper, iron, steel or titanium and the thermally conductive material has a thermal conductivity of greater than 0.34 W/m·K, the polypropylene having a melt-flow index of greater than 2 grams per 10 minutes at 230° C. under a 2,160 gram load, wherein the porous sintered polyproylene-containing material has an average pore size ranging from about 1 nm to about 1 mm.

7. A porous sintered polyvinylidene fluoride-containing material comprising:

sintered particles of polyvinylidene fluoride compounded with a thermally conductive material wherein the thermally conductive material is incorporated into particles of polyvinylidene fluoride prior to sintering the particles of polyvinylidene fluoride compounded with the thermally conductive material, wherein the thermally conductive material is carbon, carbon black, carbon fiber, aluminum, copper, iron, steel or titanium and the thermally conductive material has a thermal conductivity of greater than 0.34 W/m·K, the polyvinylidene fluoride having a melt-flow index of greater than 2 grams per 10 minutes at 232° C. under a 12,500 gram load, wherein the porous sintered polyvinylidene fluoride-containing material has an average pore size ranging from about 1 nm to about 1 mm.

8. The porous sintered polyethylene-containing material of claim 1, wherein the polyethylene has a melt-flow index of greater than 17 grams per 10 minutes at 190° C. under a 21,600 gram load.

9. A porous sintered polyethylene-containing material comprising:

sintered particles of polyethylene compounded with a thermally conductive material wherein the thermally conductive material is incorporated into the particles of polyethylene prior to sintering the particles of polyethylene compounded with the thermally conductive material, wherein the thermally conductive material is carbon, carbon black, carbon fiber, aluminum, copper, iron, steel or titanium and the thermally conductive material has a thermal conductivity of greater than 0.34 W/m·K, the polyethylene having a melt-flow index of greater than 16 grams per 10 minutes at 190° C. under a 21,600 gram load, wherein the porous sintered polyethylene-containing material has an average pore size ranging from about 0.1 μm to about 200 μm.

* * * * *

UNITED STATES PATENT AND TRADEMARK OFFICE
CERTIFICATE OF CORRECTION

PATENT NO. : 7,795,346 B2  
APPLICATION NO. : 10/978449  
DATED : September 14, 2010  
INVENTOR(S) : Timothy A. Martin and Guoqiang Mao It is certified that error appears in the above-identified patent and that said Letters Patent is hereby corrected as shown below:

In The Claims:

Column 10, Line 33, Claim 9, delete "the"

Signed and Sealed this
Eighteenth Day of January, 2011

David J. Kappos
*Director of the United States Patent and Trademark Office*